United States Patent Office 3,007,928
Patented Nov. 7, 1961

3,007,928
PIPERAZINE COMPOUNDS AND METHODS FOR THEIR PRODUCTION
Robert F. Parcell, St. Clair Shores, Mich., assignor to Parke, Davis & Company, Detroit, Mich., a corporation of Michigan
No Drawing. Filed Feb. 2, 1959, Ser. No. 790,335
9 Claims. (Cl. 260—268)

This invention is concerned with novel piperazine compounds and with methods for obtaining the same. More particularly, the invention relates to N,N'-disubstituted piperazine bases and acid-addition salts thereof which can be represented in their free base form by the structural formula

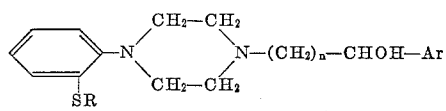

where R represents an aliphatic hydrocarbon radical having fewer than 4 carbon atoms such as a methyl, ethyl, propyl, isopropyl or allyl radical, $n$ is 2 or 3 and the group Ar is an aromatic radical such as a phenyl, (lower)alkylphenyl, (lower)alkoxyphenyl or chlorophenyl radical. In those instances in which Ar is a substituted phenyl radical, one or more of the indicated substituents can be present. For example, one of the preferred embodiments of this invention comprises those compounds in which Ar is a 3,4-dimethoxyphenyl radical. The term (lower)alkoxyphenyl, therefore, includes not only such monoalkoxyphenyl radicals as 2-methoxyphenyl, 3-methoxyphenyl and 4-methoxyphenyl, but also polyalkoxyphenyl radicals such as 3,4-dimethoxyphenyl. In those instances in which Ar is a (lower)alkylphenyl or a (lower)alkoxyphenyl radical, each of the alkyl or alkoxy groups preferably contains 1 or 2 carbon atoms.

In accordance with the invention, the products can be produced by reducing compounds having the structural formula

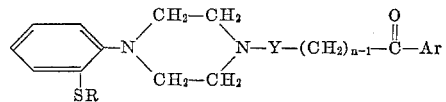

where R, $n$ and Ar are as defined before, and Y represents a carbonyl or methylene group; whereby the carbonyl group adjacent to the radical Ar is reduced to a hydroxymethylene group. In those instances in which Y represents a carbonyl group and an amide structure is present, the process proceeds with reduction of this group also.

One of the preferred methods for carrying out this reduction is by the use of a complex metal hydride such as lithium aluminum hydride. With this reducing agent, the reduction is preferably carried out in an anhydrous, non-hydroxylic, ethereal solvent such as diethyl ether, diisopropyl ether, dibutyl ether, dioxane, tetrahydrofuran, ethylene glycol dimethyl ether, or ethylene glycol diethyl ether. Such solvents can be used individually, or in mixtures with each other or with other non-hydroxylic solvents such as benzene, toluene or xylene. The quantity of solvent used need not dissolve all of the lithium aluminum hydride, but best results are obtained if sufficient solvent is used to dissolve all of the organic starting material. The organic starting material can be employed in purified form although, as indicated hereinafter, it is often most convenient to use it without isolation from the solution in which it is prepared. The temperature of the reaction is not particularly critical and good yields are obtained by conducting the reduction between room temperature and 120° C., although satisfactory results are also obtained somewhat outside of this range. The organometallic intermediate formed in the reaction mixture is hydrolytically decomposed and the desired product isolated either as the free base or as an acid-addition salt. The hydrolytic decomposition can be carried out with water or with an acidic or basic aqueous medium. The use of a basic aqueous medium is preferred.

Other reducing agents and reduction methods can also be used in the process of this invention. For example, in those instances in which Y represents a methylene radical, the reduction can be carried out with sodium borohydride or (where R is a lower alkyl group) by catalytic reduction at from 1 to 5 atmospheres of pressure in the presence of a platinum or palladium catalyst at room temperature. If desired, a step-wise reduction of the reducible groups can be carried out.

The chemical substances wherein Y represents a methylene radical which are used as starting materials in the process of this invention can be prepared by reacting a 1-o-(hydrocarbon substituted)thiophenylpiperazine of the formula

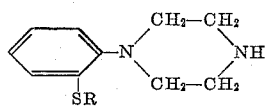

(obtainable according to the methods of U.S. 2,836,594 and 2,836,595) with an ω-halophenone of the formula

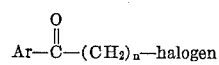

to obtain the desired compound of formula

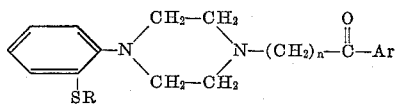

where R, $n$ and Ar are as defined before. The starting materials where Y represents a carbonyl radical can be prepared by reacting a 1-o-(hydrocarbon substituted)thiophenylpiperazine with an aroylalkanoic acid of the formula

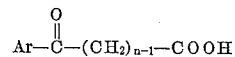

or a reactive derivative thereof such as a corresponding ester, acid halide, acid anhydride or mixed acid anhydride to obtain the desired compound of formula

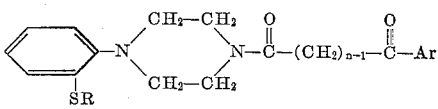

where R, $n$ and Ar are as defined before. This method is most suitable for those cases in which $n$ is 3.

In the applications of this invention, the new N,N'-disubstituted piperazines can be employed as free bases or in the form of non-toxic acid-addition salts formed by the reaction of the free bases with any of a variety of inorganic and organic acids. Among such acids are hydrochloric, hydrobromic, hydriodic, sulfuric, acetic, benzoic, citric, maleic, malic, gluconic, ascorbic, and related acids.

The compounds of the invention are valuable pharmacological agents. They are highly active as depressants of the central nervous system and are of particular value in the treatment of states of anxiety or hyper-excitability. These compounds are orally active and are relatively free from undesirable side-effects.

The invention is illustrated, but not limited, by the following examples:

*Example 1*

A stirred solution of 89 g. of 1-o-ethylthiophenylpiperazine and 55 g. of 3-bromo-3′,4′-dimethoxypropiophenone in 400 ml. of benzene is heated under reflux for 17 hours. Most of the benzene is removed by distillation and the residue is diluted with several volumes of ether. An insoluble precipitate consisting principally of 1-o-ethylthiophenylpiperazine hydrobromide is removed by filtration. The filtrate, which contains the desired intermediate 3-[4-(o-ethylthiophenyl)-1-piperazinyl]-3′,4′ - dimethoxypropiophenone, is diluted with about 600 ml. of ether and the resulting solution is added to a stirred slurry of 20 g. of lithium aluminum hydride in 3 liters of ether. This reaction mixture is stirred and heated under reflux for 22 hours. It is then decomposed by the successive addition of 20 ml. of water, 16 ml. of 20% sodium hydroxide solution and 72 ml. of water. The mixture is filtered and the filtrate is brought to dryness to afford a residue of α-{2-[4-(o-ethylthiophenyl)-1 - piperazinyl]ethyl}-3,4-dimethoxybenzyl alcohol of the structural formula

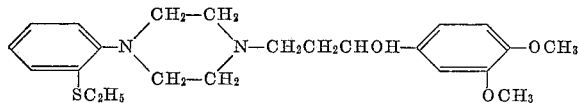

In the foregoing procedure, 46 g. of 3-chloro-3′,4′-dimethoxypropiophenone can be substituted for the 3-bromo-3′, 4′-dimethoxypropiophenone.

A monohydrochloride, M.P. 129–131° C., is obtained by treating an ethereal solution of the free base with one equivalent of hydrogen chloride in isopropyl alcohol and recrystallizing the precipitated product from a mixture of isopropyl alcohol and ether.

A water-soluble citrate is obtained by mixing methanolic solutions of the free base and citric acid and concentrating the mixture to a small volume.

*Example 2*

A stirred solution of 71 g. of 1-o-propylthiophenylpiperazine and 27 g. of 3-bromo-3′,4′-dimethoxypropiophenone in 200 ml. of benzene is heated under reflux for 16 hours. Most of the benzene is removed by distillation. The filtrate is diluted with ether and the insoluble by-product which separates is removed by filtration. The filtrate from this operation, which contains the desired intermediate, 3-[4-(o-propylthiophenyl)-1-piperazinyl]-3′,4′-dimethoxy propiophenone, is added to a well-stirred slurry of 5 g. of lithium aluminum hydride in 1500 ml. of anhydrous ether. The reaction mixture is stirred and heated under reflux for 22 hours and is then decomposed by the successive addition of 5 ml. of water, 4 ml. of 20% sodium hydroxide solution and 18 ml. of water. The solution is filtered and the filtrate evaporated to yield a residue of crude α - {2 - [4 - (o-propylthiophenyl) - 1 - piperazinyl]ethyl}-3,4-dimethoxybenzyl alcohol of the structural formula

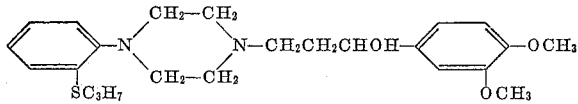

A water-soluble monohydrobromide is obtained by treating a solution of the free base in ether with one equivalent of hydrogen bromide in isopropyl alcohol.

A water-soluble monohydrochloride, M.P. 132–135° C., is obtained by treating a solution of the free base in ether with one equivalent of hydrogen chloride in isopropyl alcohol and recrystallizing the precipitated product from a mixture of isopropyl alcohol and ether.

*Example 3*

A stirred solution of 94 g. of 1-o-isopropylthiophenylpiperazine and 55 g. of 3 - bromo - 3′,4′ - dimethoxypropiophenone in 400 ml. of benzene is heated under reflux for 18 hours. Most of the benzene is removed by distillation and the remainder of the mixture is diluted with ether. The insoluble by-product, which is principally 1-o-isopropylthiophenylpiperazine hydrobromide, is removed by filtration. The filtrate, which contains the desired intermediate 3-[4-(o-isopropylthiophenyl)-1-piperazinyl]-3′,4′-dimethoxypropiophenone, is diluted with 600 ml. of anhydrous ether. This solution is gradually added to a stirred slurry of 20 g. of lithium aluminum hydride in 3 liters of anhydrous ether. The reaction mixture is stirred and heated under reflux for 23 hours and is then decomposed by the successive addition of 20 ml. of water, 16 ml. of 20% sodium hydroxide solution and 72 ml. of water. The mixture is filtered and the filtrate is evaporated to dryness to afford a residue of crude α-{2-[4-(o-isopropylthiophenyl)-1-piperazinyl]ethyl}-3,4-dimethoxybenzyl alcohol of the structural formula

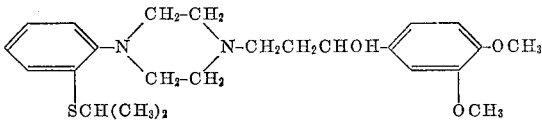

A solution of the free base in ether is treated with one equivalent of hydrogen chloride in isopropyl alcohol. The product is collected and recrystallized from a mixture of isopropyl alcohol and ether to afford the monohydrochloride, M.P. 153–154° C.

In the foregoing procedure, when 93 g. of 1-o-allylthiophenylpiperazine is substituted for the 1-o-isopropylthiophenylpiperazine, the intermediate formed is 3-[4-(o-allylthiophenyl)-1 - piperazinyl - 3′,4′ - dimethoxypropiophenone. This is converted to α-{2-[4-(o-allylthiophenyl)-1-piperazinyl]ethyl}-3,4-dimethoxybenzyl alcohol and the corresponding monohydrochloride by the method as described.

The 1-o-ispropylthiophenylpiperazine used as a starting material is prepared as follows. A mixture of 500 g. of 2-amionobenzenethiol and 600 ml. of methanol is treated with a concentrated aqueous solution of 168 g. of sodium hydroxide. This mixture is cooled to about 30° C. and, with continuous stirring and external cooling to maintain the temperature below 70° C., is treated over a 30-minute period with 492 g. of isopropyl bromide. A reflux condenser is employed in this operation. After the addition of the isopropyl bromide, the reaction mixture is stirred for 3 more hours. It is then diluted with water and extracted with ether. The ether extract is washed with dilute sodium hydroxide solution, with water, with 40% sodium hydroxide solution, and is then made anhydrous, filtered and evaporated. The residue is distilled to yield o-isopropylthioaniline, B.P. 139–141° C. at 24 mm. A mixture of 87.1 g. of this product and 81.5 g. of bis-(β-bromoethyl)amine hydrobromide in 150 ml. of chlorobenzene is heated to about 120° C. The temperature continues to rise slightly after the external heating is removed. When the temperature begins to fall, 26.4 g. of triethylamine is added and the mixture is maintained under reflux for 3½ hours. The solvent is removed by steam distillation and the remaining mixture is made strongly basic with aqueous sodium hydroxide and extracted with ether. The dried ethereal layer is evaporated and the residue is distilled in a vacuum to afford a forerun of recovered o-isopropylthioaniline and then 1-o-isopropylthiophenylpiperazine, B.P. 132–134° C. at 0.7 mm.

*Example 4*

A solution of 26 g. of β-(3,4-dimethoxybenzoyl)propionic acid and 21 g. of 1-o-methythiophenylpiperazine in 200 ml. of xylene is heated under reflux for 20 hours with continuous removal of the water formed in the reaction in a water trap. Approximately the theoretical amount (1.8 ml.) of water is collected. Most of the xylene is removed by distillation. The residual solution, which contains the desired intermediate 4-(o-methylthiophenyl)-1-(3-veratroylpropionyl)piperazine or 4-(o-methylthiophenyl) - 1 - [3 - (3,4 - dimethoxybenzoyl)propionyl]piperazine, is diluted with about 300 ml. of benzene and added to a stirred slurry of 10 g. of lithium aluminum hydride in 1500 ml. of anhydrous ether. The stirred reaction mixture is heated under reflux for 24 hours and then decomposed by the successive addition of 10 ml. of water, 8 ml. of 20% sodium hydroxide solution and 36 ml. of water. The solution is filtered and evaporated to dryness. By recrystallization of the residue from cyclohexane there is obtained α-{3-[4-(o-methylthiophenyl)-1-piperazinyl]propyl}-3,4 - dimethoxybenzyl alcohol, M.P. 106–108° C. This compound has the structural formula

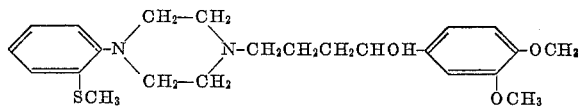

A water-soluble monohydrochloride is obtained by treating an ethereal solution of the free base with one equivalent of hydrogen chloride and collecting the precipitated product.

*Example 5*

A solution of 26 g. of β-(3,4-dimethoxybenzoyl)-propionic acid and 24 g. of 1-o-propylthiophenylpiperazine in 150 ml. of xylene is heated under reflux for 18 hours with the condensate being passed through a water trap. Approximately the theoretical amount (1.8 ml.) of water is obtained. The xylene solution contains the desired intermediate 4-(o-propylthiophenyl) - 1 - (3-veratroylpropionyl)piperazine. After removal of about 100 ml. of xylene by distillation, the residual solution is diluted with 300 ml. of anhydrous ether and added to a stirred slurry of 10 g. of lithium aluminum hydride in 2 liters of ether. The reaction mixture is stirred and heated under reflux for 24 hours. There is then added successively 10 ml. of water, 8 ml. of 20% sodium hydroxide solution and 36 ml. of water. The solution is filtered and evaporated. The residue is recrystallized from a mixture of benzene and petroleum ether to give α-{3-[4-(o-propylthiophenyl)-1-piperazinyl]propyl}-3,4-dimethoxybenzyl alcohol, which melts at about 108–110° C. and has the structural formula

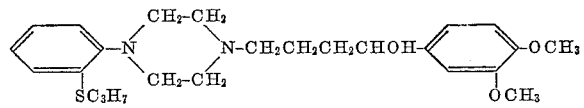

A water-soluble monohydrochloride is obtained by treating an ethereal solution of the free base with one equivalent of hydrogen chloride.

*Example 6*

A solution of 20 g. of β-benzoylpropionic acid and 24 g. of 1-o-propylthiophenylpiperazine in 125 ml. of xylene is heated under reflux with continuous removal of the water formed in the reaction. After a reflux period of 11 hours, approximately the theoretical amount (1.8 ml.) of water has been collected. The xylene solution, which contains the desired intermediate 4-(o-propylthiophenyl)-1-(3-benzoylpropionyl)piperazine, is diluted with 100 ml. of benzene and added to a stirred slurry of 10 g. of lithium aluminum hydride in 1500 ml. of anhydrous ether. This reaction mixture is stirred and heated under reflux for 11 hours and is then decomposed by the successive addition of 10 ml. of water, 8 ml. of 20% sodium hydroxide solution and 36 ml. of water. The solution is filtered and evaporated to dryness to give a residue of crude α-{3-[4-(o-propylthiophenyl)-1-piperazinyl]propyl} benzyl alcohol of the structural formula

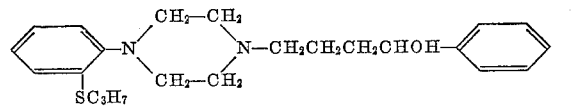

A solution of this free base in anhydrous ether is treated with one equivalent of hydrogen chloride in isopropyl alcohol. The precipitated product is collected and recrystallized from a mixture of isopropyl alcohol and ether to give the water-soluble monohydrochloride, M.P. 171–172° C.

*Example 7*

A stirred solution of 71 g. of 1-o-propylthiophenylpiperazine and 25 g. of 4-bromobutyrophenone in 200 ml. of benzene is heated under reflux for 18 hours. Most of the benzene is removed by distillation and the residue is diluted with several volumes of ether. The insoluble organic salt formed as a by-product is removed by filtration. The filtrate, which contains the desired intermediate 4-[4-(o-propylthiophenyl) - 1 - piperazinyl]butyrophenone, is added to a stirred suspension of 10 g. of lithium aluminum hydride in 1500 ml. of ether. The stirred reaction mixture is heated under reflux for 24 hours and then decomposed by adding in succession 10 ml. of water, 8 ml. of 20% sodium hydroxide solution and 36 ml. of water. The mixture is filtered and the solution evaporated to dryness to give a residue of crude α-{3-[4-(o-propylthiophenyl) - 1 - piperazinyl]propyl}benzyl alcohol which is identical with the product of Example 6 and which gives the same monohydrochloride, M.P. 171–172° C., by treatment with one equivalent of hydrogen chloride in an ethereal solution.

The foregoing procedure can also be carried out with the substitution of 4-chlorobutyrophenone for the 4-bromobutyrophenone.

*Example 8*

A solution of 23 g. of β-(4-methoxybenzoyl)-propionic acid and 22 g. of 1-o-ethylthiophenylpiperazine in 200 ml. of xylene is heated under reflux with continuous removal of the water formed in the reaction. At the end of a 16-hour reflux period, approximately the theoretical amount (1.8 ml.) of water has been collected. The xylene solution, which contains the desired intermediate 4-(o-ethylthiophenyl) - 1 - [3 - (4 - methoxybenzoyl)propionyl]-piperazine, is concentrated to about half of its original volume and then diluted with 250 ml. of ether. This ethereal solution is added to a stirred slurry of 10 g. of lithium aluminum hydride in 1500 ml. of anhydrous ether. The reaction mixture is stirred and heated under reflux for 24 hours and is then decomposed by adding 10 ml. of water, 8 ml. of 20% sodium hydroxide solution and 36 ml. of water in that order. The solution is filtered and evaporated to dryness. Successive crystallizations of the residue from a mixture of benzene and petroleum ether and then from cyclohexane give α-{3-[4-(o-ethylthiophenyl) - 1 - piperazinyl] - propyl} - 4 - methoxybenzyl alcohol which melts at about 97–99° C. and has the structural formula

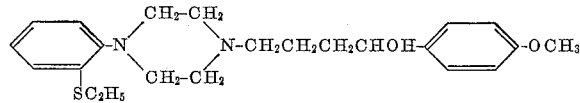

A water-soluble monohydrochloride is obtained by treeating an ether solution of the free base with one equivalent of hydrogen chloride.

*Example 9*

A solution of 23 g. of β-(4-methoxybenzoyl)-propionic acid and 24 g. of 1-o-propylthiophenylpiperazine in 200 ml. of xylene is heated under reflux for 18 hours with continuous removal of the water from the condensate. The xylene solution, which contains the desired intermediate 4 - (o-propylthiophenyl)-1-[3-(4-methoxybenzoyl)-propionyl]piperazine, is concentrated to less than one-half of its original volume and then diluted with 200 ml. of ether. This solution is added to a stirred suspension of 10 g. of lithium aluminum hydride in 1500 ml. of anhydrous ether and the stirred reaction mixture is heated under reflux for 22 hours. The mixture is then treated successively with 10 ml. of water, 8 ml. of 20% sodium hydroxide solution and 36 ml. of water. The solution is filtered and evaporated to dryness. The residue is recrystallized from a mixture of benzene and petroleum ether to give α-{3-[4-(o-propylthiophenyl)-1-piperazinyl]propyl}-4-methoxybenzyl alcohol, M.P. 84–85° C. This compound has the structural formula

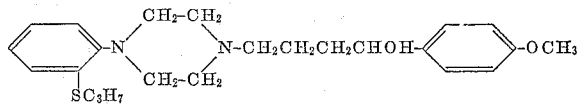

A water-soluble citrate is obtained by mixing a solution of the free base in methanol with a solution of citric acid in methanol and concentrating the mixture. The insoluble product is collected on a filter and washed with a small quantity of isopropyl alcohol and then with ether.

A water-soluble monohydrochloride is obtained by treating a solution of the free base in ether with one equivalent of hydrogen chloride in isopropyl alcohol. This monohydrochloride can be purified by recrystallization from a mixture of isopropyl alcohol and ether.

*Example 10*

A solution of 23 g. of β-(4-methoxybenzoyl)-propionic acid and 24 g. of 1-o-isopropylthiophenylpiperazine in 200 ml. of xylene is heated under reflux with a water trap for 21 hours. At the end of this time, the theoretical amount (about 1.8 ml.) of water has been removed. The xylene solution, which contains the desired intermediate 4-(o-isopropylthiophenyl) - 1 - [3-(4-methoxybenzoyl)propionyl]piperazine is concentrated to about one-half of its original volume and then diluted with 250 ml. of ether. This solution is added to a stirred suspension of 10 g. of lithium aluminum hydride in 1500 ml. of anhydrous ether. The stirred mixture is heated under reflux for 22 hours and then treated successively with 10 ml. of water, 8 ml. of 20% sodium hydroxide solution and 36 ml. of water in order to hydrolyze the organometallic product formed. The solution is filtered and evaporated to dryness to give a residue of crude α-{3-[4-(o-isopropylthiophenyl) - 1 - piperazinyl]propyl}-4-methoxybenzyl alcohol of the structural formula

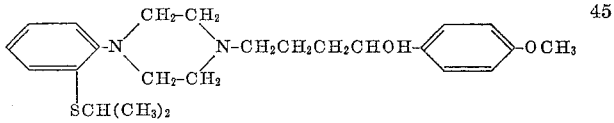

A monohydrochloride, M.P. 137–138° C., is obtained by treating a solution of the free base in ether with one equivalent of hydrogen chloride in isopropyl alcohol and recrystallizing the product from a mixture of isopropyl alcohol and ether.

*Example 11*

A solution of 27 g. of β-(4-ethoxybenzoyl)-propionic acid and 24 g. of 1-o-propylthiophenylpiperazine in 200 ml. of xylene is heated under reflux for 9 hours with continuous removal of the water formed in the reaction. Most of the xylene is removed by distillation under reduced pressure. The mixture remaining is diluted with one liter of ether and this solution is washed with saturated sodium bicarbonate solution and with water, dried, filtered and evaporated. The residue which crystallizes is 4-(o-propylthiophenyl) - 1 - [3-(4-ethoxybenzoyl)propionyl]piperazine, M.P. 72–78° C., suitable for use without further purification. This product (about 42 g.) is dissolved in 300 ml. of benzene and the solution is added to a stirred suspension of 10 g. of lithium aluminum hydride in one liter of ether. The mixture is stirred and heated under reflux for 3 hours and then decomposed by the successive addition of 10 ml. of water, 8 ml. of 20% sodium hydroxide solution and 36 ml. of water. The solution is filtered and evaporated to dryness.

By recrystallization of the residue from a mixture of benzene and petroleum ether there is obtained α-{3-[4-(o-propylthiophenyl) - 1 - piperazinyl]propyl}-4-ethoxybenzyl alchol, M.P. 82–83° C. This compound has the structural formula

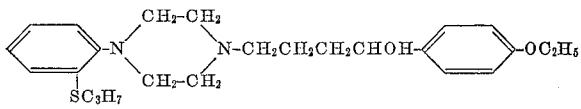

A water-soluble monohydrochloride is obtained by treating an ethereal solution of the free base with one equivalent of hydrogen chloride in isopropyl alcohol.

*Example 12*

A solution of 21.5 g. of β-(2-methoxybenzoyl)propionic acid and 23.5 g. of 1-o-propylthiophenylpiperazine in 150 ml. of xylene is heated under reflux for 4 hours with continuous removal of the water formed in the reaction. Approximately the calculated quantity (1.8 ml.) of water is collected. The xylene solution, which contains the desired intermediate 4-(o-propylthiophenyl)-1-[3-(2-methoxybenzoyl)propionyl]piperazine, is concentrated to about one-half of its original volume and added to a stirred suspension of 10 g. of lithium aluminum hydride in 1500 ml. of ether. The solution is heated under reflux for one hour and allowed to stand at room temperature for 20 hours. It is then treated successively with 10 ml. of water, 8 ml. of 20% sodium hydroxide solution and 36 ml. of water following which it is filtered and evaporated to dryness to give a residue of α-{3-[4-(o - propylthiophenyl) - 1 - piperazinyl]propyl}-2-methoxybenzyl alcohol of the structural formula

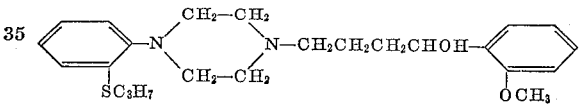

A monohydrochloride, M.P. 161–162° C., is obtained by treating an ethereal solution of the free base with one equivalent of hydrogen chloride in isopropyl alcohol and recrystallizing the product from a mixture of isopropyl alcohol and ether.

*Example 13*

A solution of 23 g. of β-(4-methylbenzoyl)-propionic acid and 24 g. of 1-o-propylthiophenylpiperazine in 200 ml. of xylene is heated under reflux for 4 hours with continuous removal of the water which is formed in the reaction. The xylene solution is concentrated to a small volume under reduced pressure and diluted with one liter of a mixture of ether and benzene. The solution is washed with saturated sodium bicarbonate solution and with water, and then dried over magnesium sulfate, filtered and evaporated. The crystalline residue is 4-(o-propylthiophenyl)-1-[3 - (4 - methylbenzoyl)propionyl] piperazine, M.P. 82–87° C. This product (about 31 g.) is dissolved in 300 ml. of benzene and the solution is added to a stirred suspension of 9 g. of lithium aluminum hydride in one liter of ether. The reaction mixture is stirred and heated under reflux for 5 hours and then allowed to stand at room temperature for 20 hours. The product is hydrolyzed by the addition of 10 ml. of water, 7 ml. of 20% sodium hydroxide solution and 34 ml. of water. The mixture is filtered and the filtrate evaporated to give a residue of α-{3-[4-(o-propylthiophenyl)-1-piperazinyl]propyl}-4-methylbenzyl alcohol of the structural formula

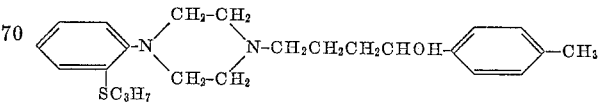

The monohydrochloride, M.P. 156–157° C., is obtained by treating an ethereal solution of the free base with one equivalent of hydrogen chloride in isopropyl alcohol and recrystallizing the product from a mixture of isopropyl alcohol and ether.

Example 14

A solution of 25 g. of β-(4-chlorobenzoyl)-propionic acid and 24 g. of 1-o-propylthiophenylpiperazine in 200 ml. of xylene is heated under reflux for 4 hours with continuous removal of the water formed in the reaction. The reaction mixture is concentrated to a small volume under reduced pressure and diluted with one liter of benzene. The benzene solution is washed with sodium bicarbonate solution and with water, dried over magnesium sulfate, filtered and evaporated. The crystalline residue is 4-(o-propylthiophenyl)-1-[3-(4-chlorobenzoyl) propionyl]-piperazine, M.P. 74–81° C. A solution of this product (about 38 g.) in 300 ml. of benzene is added to a stirred slurry of 10 g. of lithium aluminum hydride in one liter of ether. The stirred reaction mixture is heated under reflux for 3 hours and then hydrolyzed by the successive addition of 10 ml. of water, 8 ml. of 20% sodium hydroxide solution and 36 ml. of water. The solution is filtered and evaporated to give a residue of α-{3-[4-(o-propylthiophenyl)-1-piperazinyl]-propyl}-4-chlorobenzyl alcohol of the structural formula

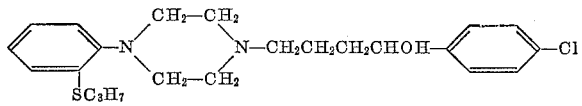

A solution of the free base in either is treated with one equivalent of hydrogen chloride in isopropyl alcohol and the product is recrystallized from a mixture of isopropyl alcohol and ether to give the monohydrochloride, M.P. 166–167° C.

A water-soluble dihydrochloride is obtained by treating a solution of the free base in isopropyl alcohol with 2.5 equivalents of anhydrous hydrogen chloride and adding a large volume of ether.

I claim:
1. A compound of the class consisting of a free base and its pharmaceutically acceptable non-toxic acid-addition salts, said free base having the structural formula

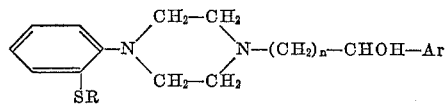

where R is an aliphatic radical of the class consisting of methyl, ethyl, propyl, isopropyl and allyl radicals, $n$ is a positive integer greater than 1 and less than 4 and Ar is an aromatic radical of the class consisting of phenyl, (lower)alkylphenyl, (lower)alkoxyphenyl and chlorophenyl radicals.

2. α-{3-[4-(o-propylthiophenyl)-1-piperazinyl]propyl}-4-methoxybenzyl alcohol.

3. α-{3-[4-(o-propylthiophenyl)-1-piperazinyl]propyl}-2-methoxybenzyl alcohol.

4. A compound having the structural formula

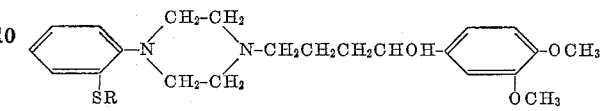

where R is an alphiphatic radical of the class consisting of methyl, ethyl, propyl, isopropyl and allyl radicals.

5. α-{3-[4-(o-propylthiophenyl)-1-piperazinyl]propyl}-3,4-dimethoxybenzyl alcohol.

6. A compound having the structural formula

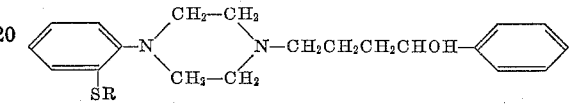

where R is an alphiphatic radical of the class consisting of methyl, ethyl, propyl, isopropyl and allyl radicals.

7. α-{3-[4-(o - propylthiophenyl) - 1 - piperazinyl]propyl}benzyl alcohol.

8. A pharmaceutically acceptable non-toxic acid-addition salt of a compound having the structural formula

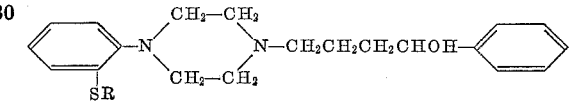

where R is an alphiphatic radical of the class consisting of methyl, ethyl, propyl, isopropyl and allyl radicals.

9. α-{3-[4-(o - propylthiophenyl) - 1 - piperazinyl]propyl}benzyl alcohol monohydrochloride.

References Cited in the file of this patent

UNITED STATES PATENTS

| 2,767,185 | Baltzly et al. | Oct. 16, 1956 |

FOREIGN PATENTS

| 794,239 | Great Britain | Apr. 30, 1958 |
| 803,403 | Great Britain | Oct. 22, 1958 |

OTHER REFERENCES

Hampton et al.: Jour. Amer. Chem. Soc., vol 59, pages 2570–2572 (1937).

Fieser et al.: Organic Chemistry (Second Edition), pages 116–117 (1950).